United States Patent
Anantharam et al.

(10) Patent No.: US 10,594,804 B2
(45) Date of Patent: Mar. 17, 2020

(54) DIRECTORY SERVICE DISCOVERY AND/OR LEARNING

(71) Applicant: International Business Machines Corporation, Armonk, NY (US)

(72) Inventors: Sushma Anantharam, Cupertino, CA (US); Amitabha Biswas, San Francisco, CA (US); Harshad S. Padhye, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 15/135,641

(22) Filed: Apr. 22, 2016

(65) Prior Publication Data
US 2016/0241649 A1  Aug. 18, 2016

Related U.S. Application Data

(63) Continuation of application No. 13/945,998, filed on Jul. 19, 2013, now Pat. No. 9,392,079.

(51) Int. Cl.
| | |
|---|---|
| *H04L 29/08* | (2006.01) |
| *G06N 20/00* | (2019.01) |
| *H04L 29/06* | (2006.01) |

(52) U.S. Cl.
CPC .............. *H04L 67/16* (2013.01); *G06N 20/00* (2019.01); *H04L 67/42* (2013.01)

(58) Field of Classification Search
CPC ...... G06F 3/0662; G06F 9/45533; G06F 9/46; G06F 9/4856; G06F 9/50; G06F 9/5005; G06F 9/5022; G06F 9/5027; G06F 9/5055; G06F 9/5061; G06F 9/505; G06F 9/5083;
(Continued)

(56) References Cited

U.S. PATENT DOCUMENTS

| | | |
|---|---|---|
| 6,859,834 B1 | 2/2005 | Arora et al. |
| 8,843,600 B1 | 9/2014 | Gabrielson et al. |
| 2002/0013827 A1 | 1/2002 | Edstrom et al. |

(Continued)

FOREIGN PATENT DOCUMENTS

| | | |
|---|---|---|
| CN | 105453058 A | 3/2016 |
| JP | 2001229070 A | 8/2001 |

(Continued)

OTHER PUBLICATIONS

Campo, Celeste, "Directory Facilitator and Service Discovery Agent", pp. 1-16, Jul. 19, 2002.

(Continued)

*Primary Examiner* — Philip C Lee
(74) *Attorney, Agent, or Firm* — Stephen R. Yoder; Gilbert Harmon, Jr.

(57) ABSTRACT

In the context of a client sub-system that requires the use of directory services on behalf of a tenant (such as an overlay tenant), learning an identity of a server node, that can provide such directory services by: (i) sending, by the client sub-system to a first server node, a first directory service request for directory service for a first tenant; (ii) receiving, by the client sub-system, a first acknowledgement from a second server node; and (iii) learning, by the client sub-system, that the second server node can provide directory service for the first tenant based upon the first acknowledgement.

9 Claims, 5 Drawing Sheets

(58) Field of Classification Search
CPC .. G06F 2009/4557; H04L 67/16; G06N 20/00
USPC ...................... 718/1, 100, 104, 105; 709/226
See application file for complete search history.

(56) References Cited

U.S. PATENT DOCUMENTS

| | | |
|---|---|---|
| 2005/0010653 A1 | 1/2005 | McCanne |
| 2005/0138461 A1 | 6/2005 | Allen et al. |
| 2006/0248191 A1 | 11/2006 | Hudson et al. |
| 2007/0156813 A1 | 7/2007 | Galvez et al. |
| 2008/0155537 A1 | 6/2008 | Dinda et al. |
| 2009/0300580 A1 | 12/2009 | Heyhoe et al. |
| 2010/0182934 A1 | 7/2010 | Dobbins et al. |
| 2011/0004649 A1 | 1/2011 | Nord et al. |
| 2011/0283017 A1* | 11/2011 | Alkhatib ............. H04L 12/4641 709/244 |
| 2011/0320821 A1 | 12/2011 | Alkhatib et al. |
| 2012/0297384 A1* | 11/2012 | Barabash .............. H04L 49/356 718/1 |
| 2013/0034109 A1 | 2/2013 | Cardona et al. |
| 2014/0059594 A1 | 2/2014 | Stein |
| 2015/0026102 A1 | 1/2015 | Anantharam et al. |

FOREIGN PATENT DOCUMENTS

| | | |
|---|---|---|
| JP | 2012123459 A | 6/2012 |
| WO | 2015008450 A1 | 1/2015 |

OTHER PUBLICATIONS

"Directory Service"—Wikipedia, the free encyclopedia, page last modified Mar. 25, 2013 at 17:58, pp. 1-6, <http://en.wikipedia.org/w/index.php?title=Directory_service&oldid=546943197>.

International Search Report from Application No. PCT/JP2014/003586 dated Aug. 5, 2014.

Written Opinion from PCT Application No. PCT/JP2014/003586 dated Aug. 5, 2014.

* cited by examiner

DIRECTORY SERVICE DISCOVERY AND/OR LEARNING

FIELD OF THE INVENTION

The present invention relates generally to the field of directory services, and more particularly to directory service discovery and/or learning.

BACKGROUND OF THE INVENTION

A directory service is a software system that stores, organizes and provides access to information in a "directory." A "directory" is a map correlating "names" and "values." The correlations of the map allow the lookup of values given a name. Similar to the way that a word in a dictionary may have multiple definitions, a "name" may be associated with multiple pieces of information. To extend this analogy, as a word listed in a dictionary may alternatively denote different parts of speech and different definitions, a "name" in a "directory" may have many different types of data correlated to it.

A directory service is an important component of a NOS (Network Operating System). In a directory used by a network operating system (NOS), nodes represent resources that are managed by the NOS. These resources may include: users, computers, printers and/or other shared resources. Some directory services have descended from the X.500 directory service. A directory service is a shared information infrastructure for locating, managing, administering, and organizing common items and network resources, which can include volumes, folders, files, printers, users, groups, devices, telephone numbers and other objects. Those of skill in the art will appreciate that a directory service is not the same thing as a "relational database."

An example of a conventional system that uses directory services will now be explained as a way of introducing some of the terminology used herein. The system has multiple server nodes, each of which provides directory services. These multiple server nodes that provide directory service are collectively called a "cluster." The cluster handles all the collective tenants, system-wide. In this example system: (i) there are two tenants; (ii) the two tenants (Company A and Company B) are "overlay tenants;" (iii) each tenant has its own private "overlay network;" and (iv) each tenant's respective overlay network is invisible to the other overlay tenant. The "client" (as that term is used herein) provides the overlay network connectivity. For example, one kind of client is a switch that provides connectivity to virtual machines (VMs) and/or hosts belonging to both Company A and Company B.

SUMMARY

According to an aspect of the present invention, there is a method including the following steps: (i) sending, by the client sub-system to a first server node, a first directory service request for directory service for a first tenant; (ii) receiving, by the client sub-system, a first acknowledgement from a second server node; and (iii) learning, by the client sub-system, that the second server node can provide directory service for the first tenant based upon the first acknowledgement.

DETAILED DESCRIPTION

Figure 1:
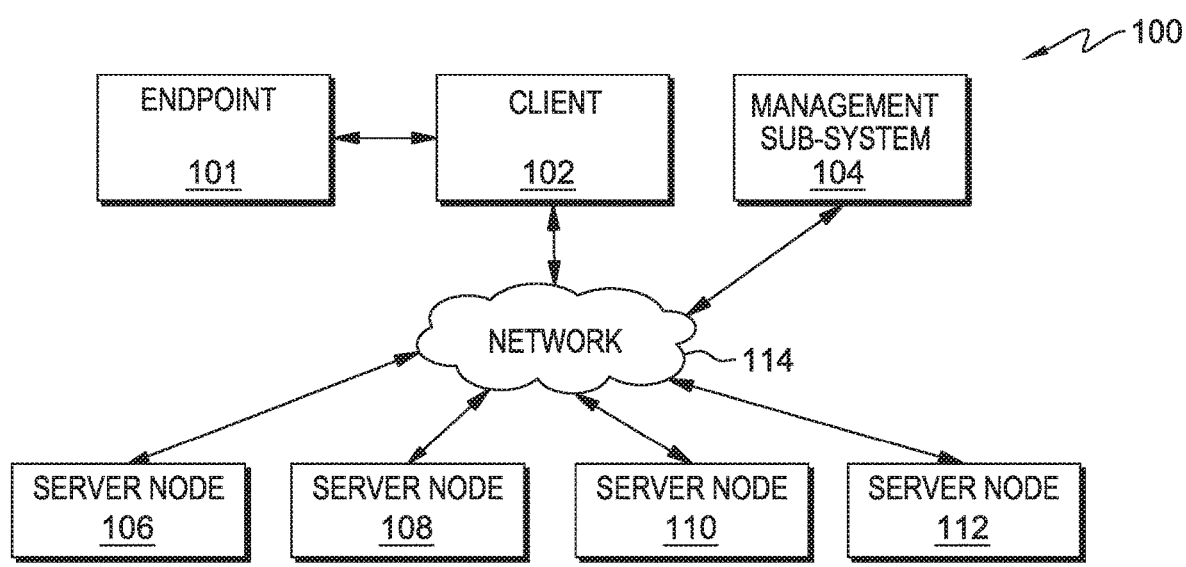
FIG. 1 is a schematic view of a first embodiment of a computer system (that is, a system including one or more processing devices) according to the present invention.

This Detailed Description section is divided into the following sub-sections: (i) The Hardware and Software Environment; (ii) Operation of Embodiment(s) of the Present Invention; (iii) Further Comments and/or Embodiments; and (iv) Definitions.

I. THE HARDWARE AND SOFTWARE ENVIRONMENT

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 2:
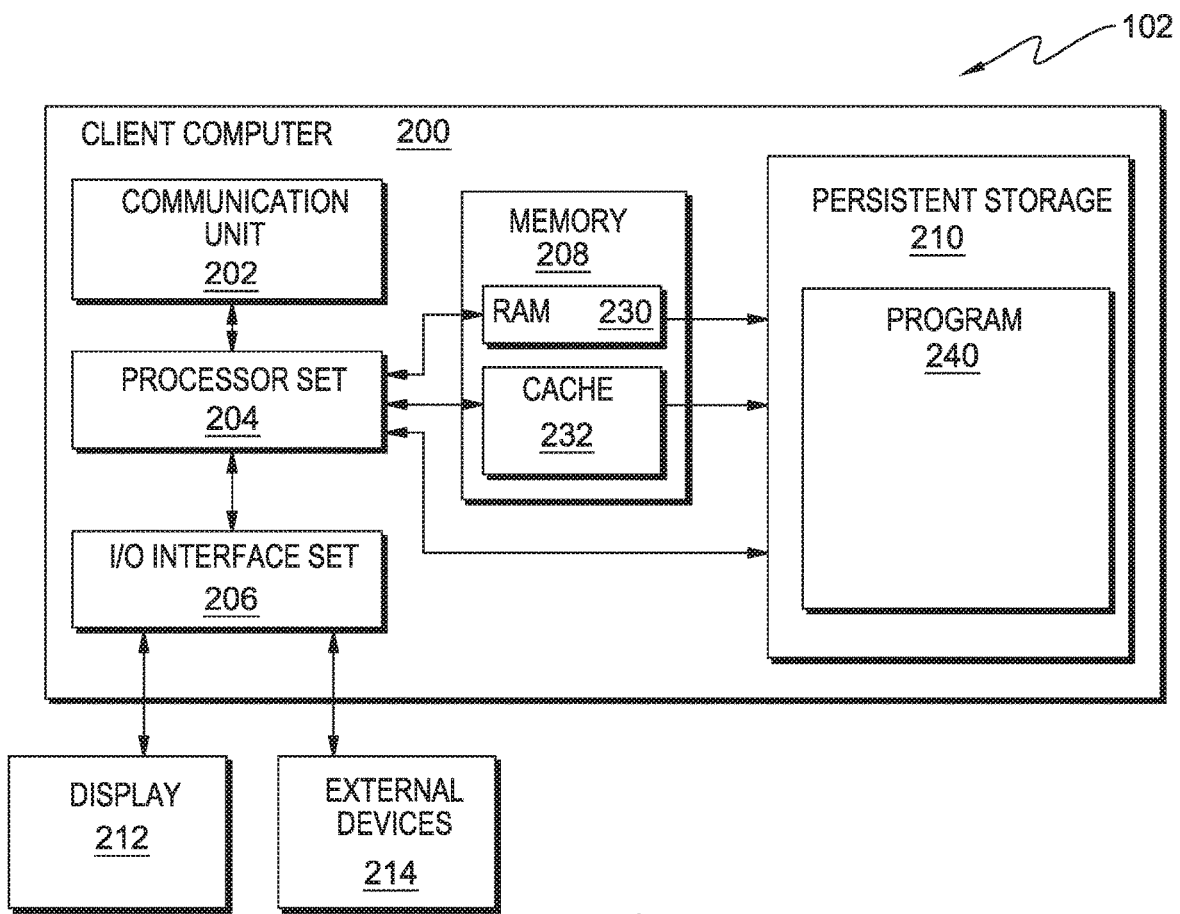
FIG. 2 is a schematic view of a client computer sub-system portion of the first embodiment computer system.

An embodiment of a possible hardware and software environment for software and/or methods according to the present invention will now be described in detail with reference to the Figures. FIGS. 1 and 2 collectively make up a functional block diagram illustrating various portions of computer system 100, including: endpoint entity 101; client sub-system 102; management sub-system 104; first server node 106; second server node 108; third server node 110; fourth server node 112; communication network 114; client computer 200; communication unit 202; processor set 204; input/output (i/o) unit 206; memory device 208; persistent storage device 210; display device 212; external device set 214; random access memory (RAM) device 230; cache memory device 232; and program 240. In this embodiment, endpoint entity is a virtual machine, but an endpoint entity may be a suitable device, now known or to developed in the future, for acting as a network communication endpoint.

As shown in FIG. 2, client sub-system 102 (including its constituent computer 200 and peripherals) is a plain old regular computer sub-system and is, in many respects, representative of the various computer sub-system(s) in the present invention. Alternatively, and as discussed below in connection with the embodiment of FIG. 6, a client sub-system could be primarily comprised of a special purpose computer, such as a "switch." Several portions of computer sub-system 102 will now be discussed in the following paragraphs.

Client sub-system 102 may be a laptop computer, tablet computer, netbook computer, personal computer (PC), a desktop computer, a personal digital assistant (PDA), a smart phone, or any programmable electronic device capable of communicating with the management sub-system and server nodes via network 114. Program 240 is a is a collection of machine readable instructions and/or data that is used to create, manage and control certain software functions that will be discussed in detail, below, in the Operation of the Embodiment(s) sub-section of this Detailed Description section.

Client sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, client sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as server nodes (see definition, below, in the Definitions sub-section) 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. OPERATION OF EMBODIMENT(S) OF THE PRESENT INVENTION

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
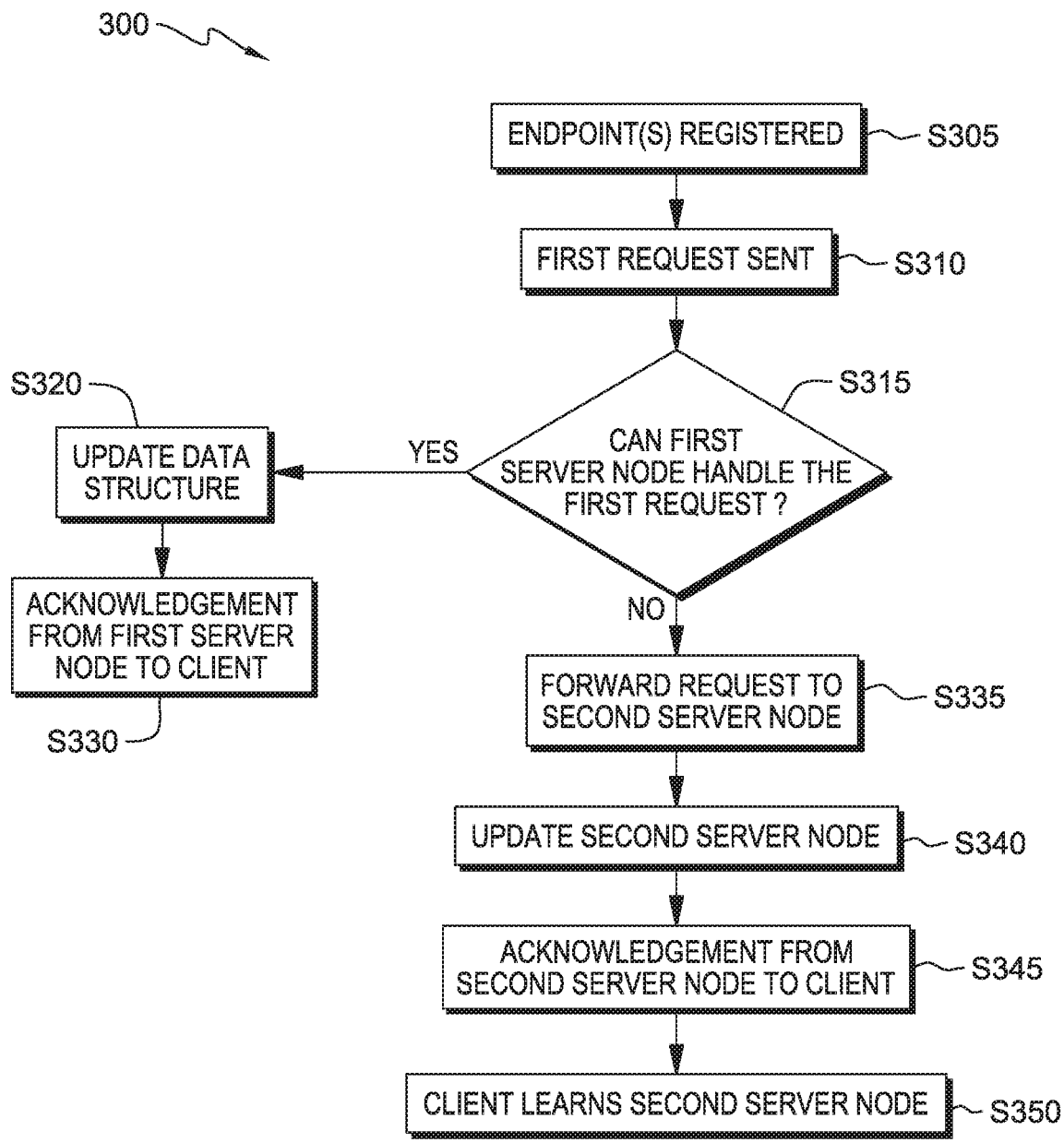
FIG. 3 is a flowchart showing a first process performed, at least in part, by the first embodiment computer system.
Figure 4:
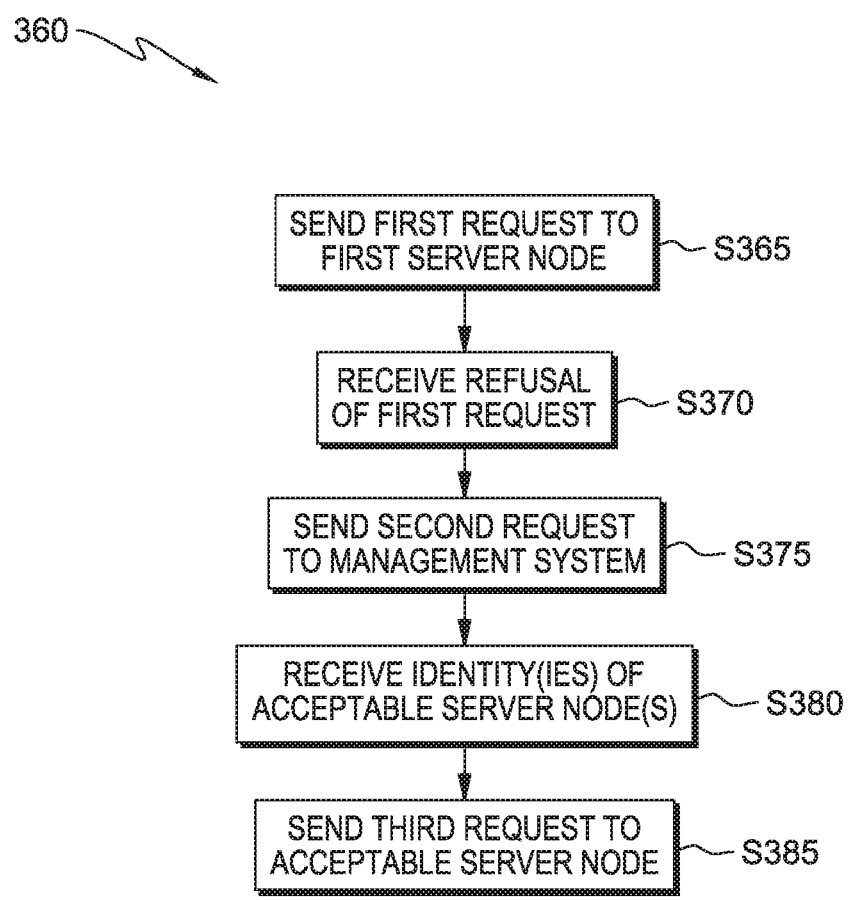
FIG. 4 is a flowchart showing a second process performed, at least in part, by the first embodiment computer system which process is a discovery mechanism that can be used when the learning process of FIG. 3 does not work.
Figure 5:
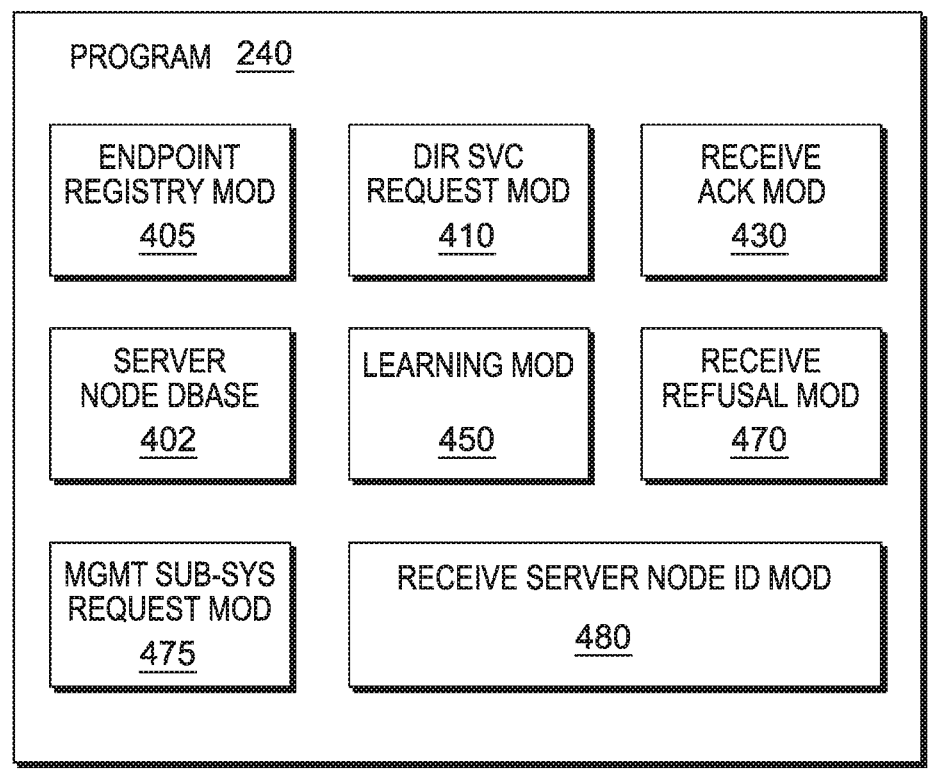
FIG. 5 is a schematic view of a software program performed by the first embodiment computer system.

FIGS. 3 and 4 respectively show flow charts 300 and 360 depicting two methods according to some embodiments of the present disclosure. Both of these methods can help a client computer sub-system find an appropriate server node to provide directory services. In some embodiments, method 360, of FIG. 4, is used only if method 300, of FIG. 3 fails to provide the client computer sub-system with an appropriate server node. FIG. 5 shows program 240 for performing at least some of the method steps of methods 300 and 360. These method and associated software will now be discussed, over the course of the following paragraphs, with extensive reference to FIGS. 3 and 4 (for the method step blocks) and FIG. 5 (for the software blocks).

Method 300 begins at step S305, where endpoint registry module ("mod") 405 of program 240 of client sub-system 102 registers endpoint entity 101 (see FIGS. 1 and 2). More specifically, endpoint entity 101 belongs to a "tenant," and, as such, is allowed to use certain server nodes 106, 108, 110, 112 for directory services. A client can use any server node for directory services. The endpoint belonging to a tenant may not be able to talk to endpoints in another tenant. Management sub-system 104 has information regarding which server nodes may be used by the tenant of endpoint entity 101. In this method 300, server node database 402 of program 240 is provided with the identity (that is, addresses and/or the like) of a server node that should be suitable for use with the tenant of endpoint 101. In this example: (i) the server node is first server node 106; and (ii) server node database 402 of program 240 of client sub-system 102 received the identity of first server node 106 by querying management sub-system 104 prior to the beginning of method 300. Alternatively, server node database 402 may have received that information in other ways as will be discussed in the Further Comments and/or Embodiment(s) sub-section, below.

Processing proceeds to step S310 where directory service request module 410 makes a first request, for directory service, to first server node 106 through network 114 (see FIG. 1). The request is made to the first server node, as opposed to one of the other server nodes, because server node database 402 identified the first server node as being a server node appropriate for the tenant of endpoint 101, as discussed above in connection with step S305. In the event that the server node database 402 doesn't have the exact match (tenant-to-node), then it will return any one of the known server nodes.

Processing proceeds to step S315 where first server node 106 decides whether it can, and should, handle the first request sent by client sub-system 102 on behalf of the tenant of endpoint 101 (see FIG. 1). One possible reason that the first server node may determine that it will not provide directory service to client sub-system 102 is that the server database may not have the tenant-to-node mapping yet (that is, the initial request).

If, at step S315, the first server node determines that it can handle the request for directory services then processing proceeds to step S320 where a local data structure is updated at the first server node. More specifically, the update is made because the endpoint data is registered or changed (for example, a new IP address is added to that endpoint 101).

Processing proceeds to step S330 where the first server node sends an acknowledgement ("ACK") to receive ACK mod 430 of program 240 of client sub-system 102. Pursuant to this acknowledgement, first server node 106 provides directory service for client sub-system 102 acting on behalf of the tenant of endpoint entity 101. Under this branch of process flow, there is no "discovery," or "learning" by client sub-system 102 because the server node that provides directory service for the tenant is a server node that client sub-system 102 (specifically server node database 402 of program 240) already "knew" could be used to provide directory service for that client on behalf of the tenant of endpoint entity 101.

If, at step S315, the first server node determines that it can not handle the request for directory services then processing proceeds to step S335 where the first request is forwarded from first server node 106 to second server node 108. In this example of method 300, second server node 108 is qualified to serve the tenant of endpoint entity 101.

Processing proceeds to step S340 where the second server node 108 (see FIG. 1) is updated. More specifically, the update is made because the endpoint data is registered or changed (for example, a new IP address is added to that endpoint 101). That data will be stored at other nodes, as well. Second server node 108 will determine which other entities need to update their database (that is, other nodes that manage that tenant).

Processing proceeds to step S345 where the second server node sends an acknowledgement ("ACK") to receive ACK mod 430 of program 240 of client sub-system 102. Pursuant to this acknowledgement, second server node 108 provides directory service for client sub-system 102 acting on behalf of the tenant of endpoint entity 101. The client sub-system records this fact. In this way, future requests related to that tenant (of endpoint 101) from client sub-system 102 will go to node 108 (that is, updates and requests related to other endpoints on client 102 characterized by same tenant as endpoint 101 will go to node 108).

Processing proceeds to step S350 where learning mod 450 of program 240 of client sub-system 102: (i) "learns" that the second server node can provide directory service for the tenant of endpoint entity 101; and (ii) stores this learned information on server node database 402 of program 240 of client sub-system 102.

Now method 360 of FIG. 4 will be discussed with continuing reference to the software blocks of FIG. 5. Process 360 begins at step S365 where directory service request mod 410 of program 240 of client sub-system 102 on behalf of the tenant of endpoint entity 101 sends a directory service request to first server node 106 for directory service for endpoint entity 101 and its associated tenant. This step is similar to step S310 of previously-discussed process 300.

In process 360, first server node 106 is: (i) not able to handle the first directory service request on its own; and (ii) not able to find an alternative server node that can handle the first directory service request made by service request mod 410 at step S365.

Processing proceeds to step S370 where receive refusal mod 470 receives a refusal sent by first server node 106 back to client sub-system 102. Typically, this refusal is not explicit, but, rather takes the form of the request being dropped and the client sub-system timing out.

Processing proceeds to step S375 where management sub-system request mod 475 sends out a second request to management sub-system 104. The second request requests management sub-system 104 to provide an identity of at least one server node that can handle directory service requests made on behalf of the tenant of endpoint entity 101.

Processing proceeds to step S380, where receive server identification mod 480 receives a response from management sub-system 104, which response includes the identity of the server node(s) that can provide directory service for the tenant. At step S380, the identification of these server node(s) is/are stored in server node database 402 of program 240 of client sub-system 102.

Processing proceeds to step S385, where directory service request mod 410 of program 240 of client sub-system 102 sends a third request, for directory services for its tenant, to one of the server node(s) discovered at step S380. This request is accepted and discovery service is now available for endpoint entity 101.

It is noted that program 240 has sufficient software to provide both method 300 and method 360. Other embodiments of the present disclosure may perform only one of these software-implemented methods, without necessarily performing the other.

III. FURTHER COMMENTS AND/OR EMBODIMENTS

This disclosure describes methods to discover and/or learn servers providing directory services when there are multiple servers that provide directory services. In this example, discovery and learning are distinct, but related processes. In some embodiments of the present invention, a client sub-system will: (i) discover a "seed/starting server" by asking a management station for the identity of a seed/starting station; and then (ii) later on learn other relevant servers by talking to the "seed" or other new learned servers. Accordingly, "discovery" is used herein to apply to receiving an identity of a component by specifically asking for that information, while "learning" applies to determining identities of components by inferring the identity(ies) of a kind of component through operations other than receipt of responses to specific requests.

In some embodiments of the present invention, a client communicates with a "connectivity server" to determine which VMs and/or host can communicate with each other in a given overlay network.

One "server node" in a cluster of servers providing directory services: (i) will generally handle multiple overlay tenants; but (ii) will not handle all the overlay tenants system-wide. Each overlay tenant of the directory service will have knowledge of a subset of server nodes providing the directory service and will exclusively use server nodes of that subset to obtain needed directory service information. A client inspects responses (with tenant information in them) from the server nodes, and, if a responding server node is not included in that client's set of known server nodes, then the responding server node will be added to that client's set of known nodes. In this way, the client "learns" a new server node, rather than "discovering the server node through a request. The server nodes in the cluster: (i) have information indicating the mapping between tenants and the server nodes respectively handling each client; and (ii) can forward queries to a correct server node when a client's query has been directed to an incorrect server node. It is beneficial for each client to learn the (not generally one-to-one) mapping between tenants and server nodes handling them, so that any subsequent requests from that client can be made to the correct server nodes.

Figure 6:
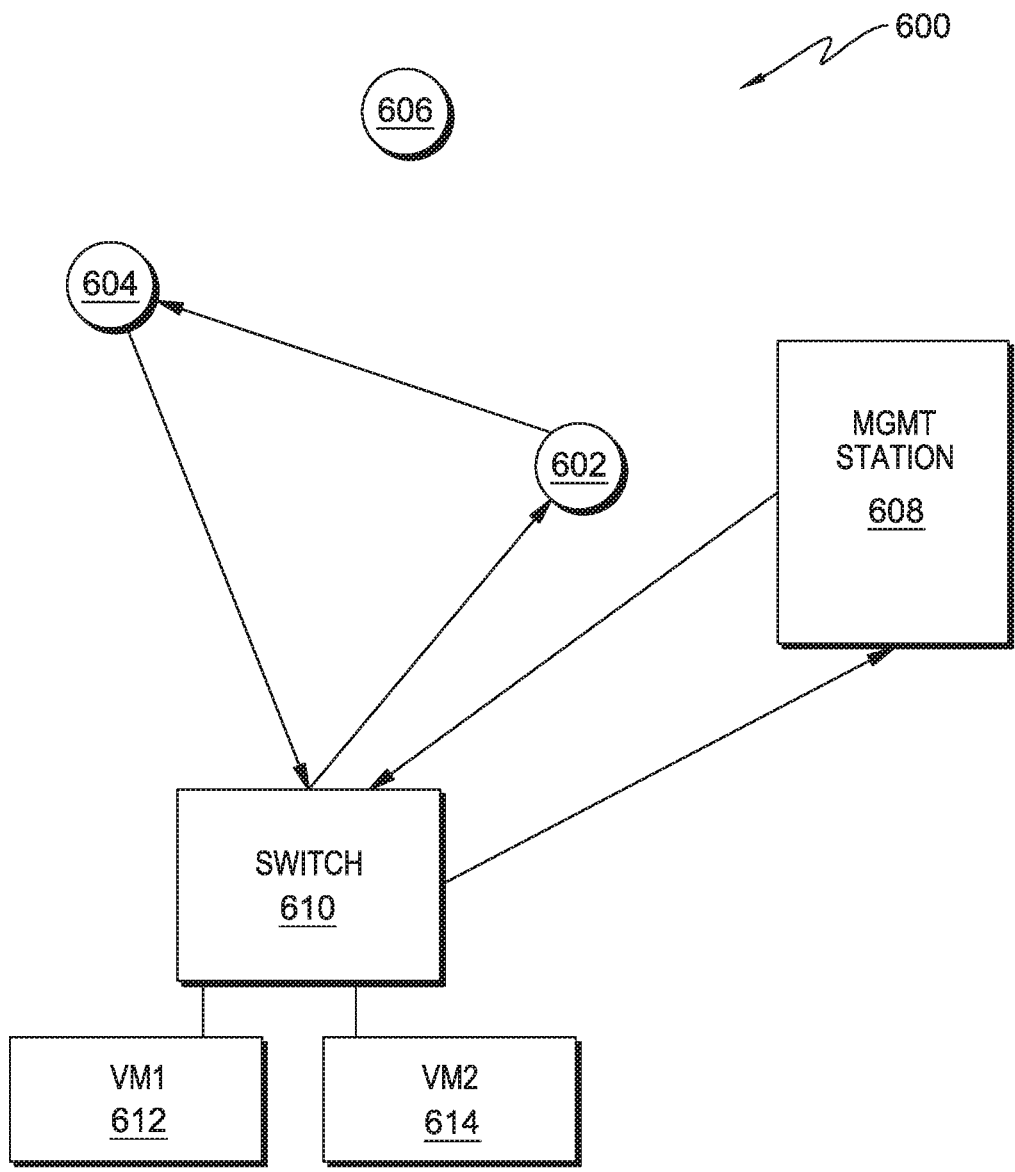
FIG. 6 is a schematic view of a second embodiment of a computer system (that is, a system including one or more processing devices) according to the present invention.

FIG. 6 shows computer system 600, including: first server node (note: a server node may also be referred to as a "network control system") 602; second server node 604; third server node 606; management station 608; switch (also, more generically, called networking system) 610; first virtual machine 612; and second virtual machine 614. Networking system 610 has the address of management station 608 and registers with management station 608 by sending a request to it. Responsive to the request, management station 608 sends at least one server node's IP address (in this case the address of first server node 602) back to networking system 610. In this way, switch 610 "discovers" a server node that provides directory service.

Switch 610 proceeds to register endpoints (that is, VMs 612, 614) as they come alive. Switch 610 sends information regarding registered endpoints and associated overlay tenant information to first server node 602. In response, first server node 602 determines if it is handling the particular overlay tenant of the registered endpoints. There are three possible outcomes that might result from the directory service request from switch 610 to first server node 602, which three possible outcomes will be respectively discussed in the following three paragraphs.

As the first possible outcome, if first server node 602 does handle that particular overlay tenant then the following actions are performed: (i) update local data structure; (ii) carry out replication from the first server node to at least the second server node; and (iii) first server node sends acknowledgement ("ACK") to switch 610.

As the second possible outcome, if first server node 602 does not handle the overlay tenant of the registered endpoints then the following actions are performed: (i) forward request from switch 610 to second server node 604; (ii) second server node 604 learns the mapping between switch 610 and the overlay tenant of its registered endpoints 612, 614; (iii) second server node 604 carries out replication; and (iv) second server node 604 sends ACK to switch 610. In this way, switch 610 "learns," based upon the fact that ACK was received from second server node 604, at least that: (i) first server node 602 is not suitable for the overlay tenant of its VMs 612, 614; and (ii) second server node 604 is suitable for the overlay tenant of its VMs 612, 614. The learning of second server node 604 by switch 610 is a form of directory service learning. Because the reply to the "register endpoint" will come to switch 610 from the second server node 604, it is an implicit communication to the effect that overlay tenant for VMs 612 and 614 are handled by second server node 604.

As the third possible outcome, if the directory service request from switch 610 goes unanswered from any server node 602, 604, 606, system-wide, then switch 610 requests management station 608 to provide at least one new server node's IP address. This third possibility is a form of "discovery," because the switch must make an explicit request to receive an indication of a suitable server node for a given overlay tenant.

In this embodiment management station 608s' address is input by a user into switch 610. Alternatively, the management station address may be included an information upload that occurs automatically during the client configuration process. In this embodiment, management station 608: (i) optimizes load balancing; and (ii) provides at least one DPS IP address (that is a seed/starter address) to switch 610. Load may be defined as any combination of the following: number of requests received/issued, number of resources used, cpu (central processing unit) processing time used, memory used, amount traffic, etc. In various embodiments of the present disclosure, there are at least two options with respect to how load balancing is accomplished: (i) the client has the identity of various server nodes that can handle given overlay tenant and chooses a server node based upon identity of the overlay tenant and upon load balancing type concerns; and/or (ii) before forwarding the request to the correct server node, a server node that receives an initial request for directory service from a client can perform load balancing to determine which server node to forward the request (based at least in part upon the identity of the overlay tenant).

Some embodiments of the present disclosure may have one, or more, of the following advantages, characteristics and/or advantages: (i) a management system (for example, a controller) can perform a function to optimize load balancing; (ii) a management system (for example, a dove controller) communicates the tenant and configuration information to all clients (for example, all dove switches); (iii) a client (for example, a dove switch) has information identifying multiple server nodes (perhaps even all server nodes) that are handling a given overlay tenant; (iv) before forwarding the request to the correct server node, a server can perform load balancing to determine which other server node should optimally have the request forwarded to it; (v) when a request is forwarded from one server node to another server node, the forwarded server node learns the mapping between client A (for example, dove switch) that made the request and the overlay tenant for whom the request was made; (vi) a client (for example, a dove switch) performs load balancing (specifically, client side load balancing for requests related to a particular tenant) to determine which server node to select for a directory service request; and/or (vii) if a client request to a server node goes unanswered (from any server node system-wide), then the client requests the management system to provide at least one new server node address suitable for its overlay tenant that requires directory service. As a possible (and perhaps even preferable) alternative to item (i) in the preceding sentence, the Cluster of Server Nodes can also elect one server node to do the load balancing.

Some embodiments of the present disclosure may have one or more of the following features, characteristics and/or advantages: (i) provides discovery and/or mapping of "hosting name servers" (that is, server nodes); (ii) used for client communication sub-systems that serve tenant(s); (iii) does not require flooding; (iv) can handle clients other than VLAN switch type clients; (v) does not require redirector nodes; (vi) does not require a broadcast methodology; (vii) client sends a directory service request to any single server node of a content/data cluster and this request may or may not be forwarded by the server node to which it is initially sent.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, and application-specific integrated circuit (ASIC) based devices.

Server node: any server that provides directory service.

What is claimed is:

1. A method comprising:
receiving, by a switch in data communication with a plurality of endpoint virtual machines and a management station, a network address of the management station;
registering the switch with the management station;
receiving, by the switch from the management station, a set of one or more networking control system addresses respectively corresponding to a set of one or more networking control systems;
in response to a first endpoint virtual machine of the plurality of endpoint virtual machines becoming operative, registering, at the switch, the first endpoint virtual machine with a network controller;
sending, by the switch to a first networking control system of the set of one or more networking control systems, first tenant information identifying a first tenant using the first endpoint virtual machine;
on condition that the first networking control system is not handling the first tenant:
forwarding, from the switch to a second networking control system, a request
receiving, by the switch, an acknowledgement of the request from the second networking control system, and
responsive to the acknowledgement, learning, by the switch, a mapping of the first tenant to the second networking control system.

2. The method of claim 1 further comprising:
on condition that the first networking control system is handling the first tenant, updating a local data structure of the first networking control system; and
on condition that the first networking control system is handling the first tenant, carrying out replication from the first networking control system to the second networking control system.

3. The method of claim 1 further comprising:
on condition that the first networking control system is not handling the first tenant:
carrying out, by the second networking control system, replication.

4. A computer program product comprising:
a non-transitory storage device structured and/or programmed to store machine readable data; and
machine readable data stored in the non-transitory storage device, the machine readable data including the following program instructions:
program instructions programmed to receive, by a switch in data communication with a plurality of endpoint virtual machines and a management station, a network address of the management station,
program instructions programmed to register the switch with the management station,
program instructions programmed to receive, by the switch from the management station, a set of one or more networking control system addresses respectively corresponding to a set of one or more networking control systems;
program instructions programmed to, in response to a first endpoint virtual machine of the plurality of endpoint virtual machines becoming operative, register, at the switch, the first endpoint virtual machine with a network controller,
program instructions programmed to send, by the switch to a first networking control system of the set of one or more networking control systems, first tenant information identifying a first tenant using the first endpoint virtual machine,
program instructions programmed to, on condition that the first networking control system is not handling the first tenant, forward, from the switch to a second networking control system, a request,
program instructions programmed to, on condition that the first networking control system is not handling the first tenant, receive, by the switch, an acknowledgement from the second networking control system, and
program instructions programmed to, responsive to the acknowledgement, learn, by the switch, a mapping of the first tenant to the second networking control system.

5. The computer program product of claim 4 wherein the machine readable data further includes the following program instructions:
program instructions programmed to, on condition that the first networking control system is handling the first tenant, update a local data structure of the first networking control system; and program instructions programmed to, on condition that the first networking control system is handling the first tenant, carry out replication from the first networking control system to the second networking control system.

6. The computer program product of claim 4 wherein the machine readable further includes the following program instructions:
program instructions programmed to, on condition that the first networking control system is not handling the first tenant:
carry out, by the second networking control system, replication.

7. A computer system comprising:
a set of one or more processors
a storage device structured and/or programmed to store machine readable data; and
machine readable data stored in the storage device, the machine readable data including the following program instructions:
program instructions programmed to receive, by a switch in data communication with a plurality of endpoint virtual machines and a management station, a network address of the management station,
program instructions programmed to register the switch with the management station,
program instructions programmed to receive, by the switch from the management station, a set of one or more networking control system addresses respectively corresponding to a set of one or more networking control systems,
program instructions programmed to, in response to a first endpoint virtual machine of the plurality of endpoint virtual machines becoming operative, register, at the switch, the first endpoint virtual machine with a network controller,
program instructions programmed to send, by the switch to a first networking control system of the set of one or more networking control systems, first tenant information identifying a first tenant using the first endpoint virtual machine,
program instructions programmed to, on condition that the first networking control system is not handling the first tenant, forward, from the switch to a second networking control system, a request,
program instructions programmed to, on condition that the first networking control system is not handling the first tenant, receive, by the switch, an acknowledgement from the second networking control system, and
program instructions programmed to, responsive to the acknowledgement, learn, by the switch, a mapping of the first tenant to the second networking control system.

8. The computer system of claim 7 wherein the machine readable data further includes the following program instructions:
program instructions programmed to, on condition that the first networking control system is handling the first tenant, update a local data structure of the first networking control system; and
program instructions programmed to, on condition that the first networking control system is handling the first tenant, carry out replication from the first networking control system to the second networking control system.

9. The computer system of claim 7 wherein the machine readable data further includes the following program instructions:
program instructions programmed to, on condition that the first networking control system is not handling the first tenant:
carry out, by the second networking control system, replication.

* * * * *